Aug. 26, 1969  K. W. GEHRKE  3,463,559
HYDRAULIC TRACK ADJUSTER FOR TRACTOR
Filed Feb. 20, 1967  3 Sheets-Sheet 2
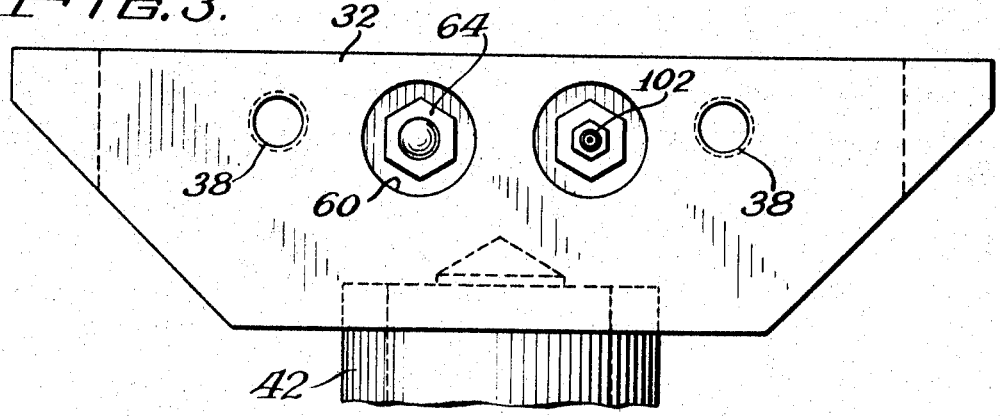
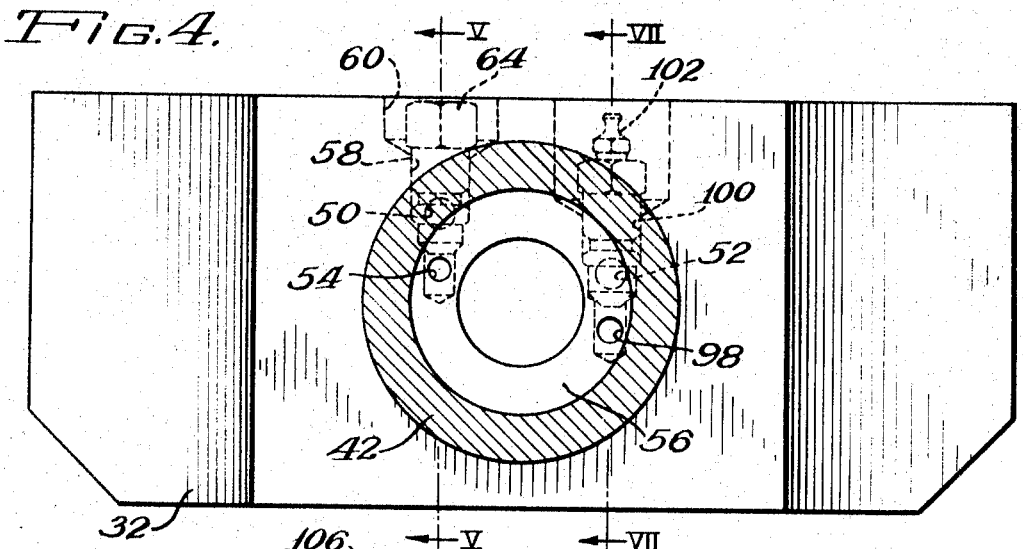
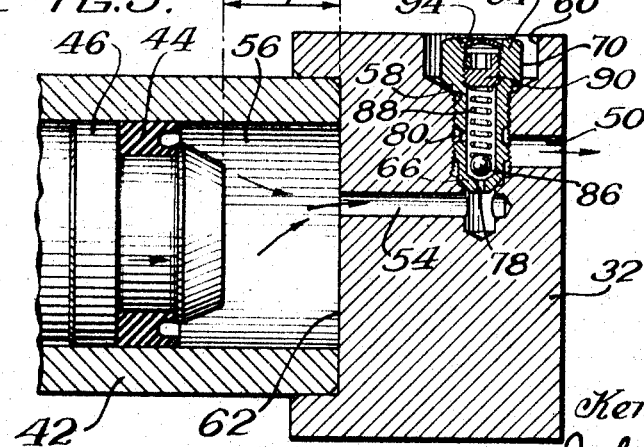
Inventor:
Kenneth W. Gehrke
By John W. Haines
Atty.

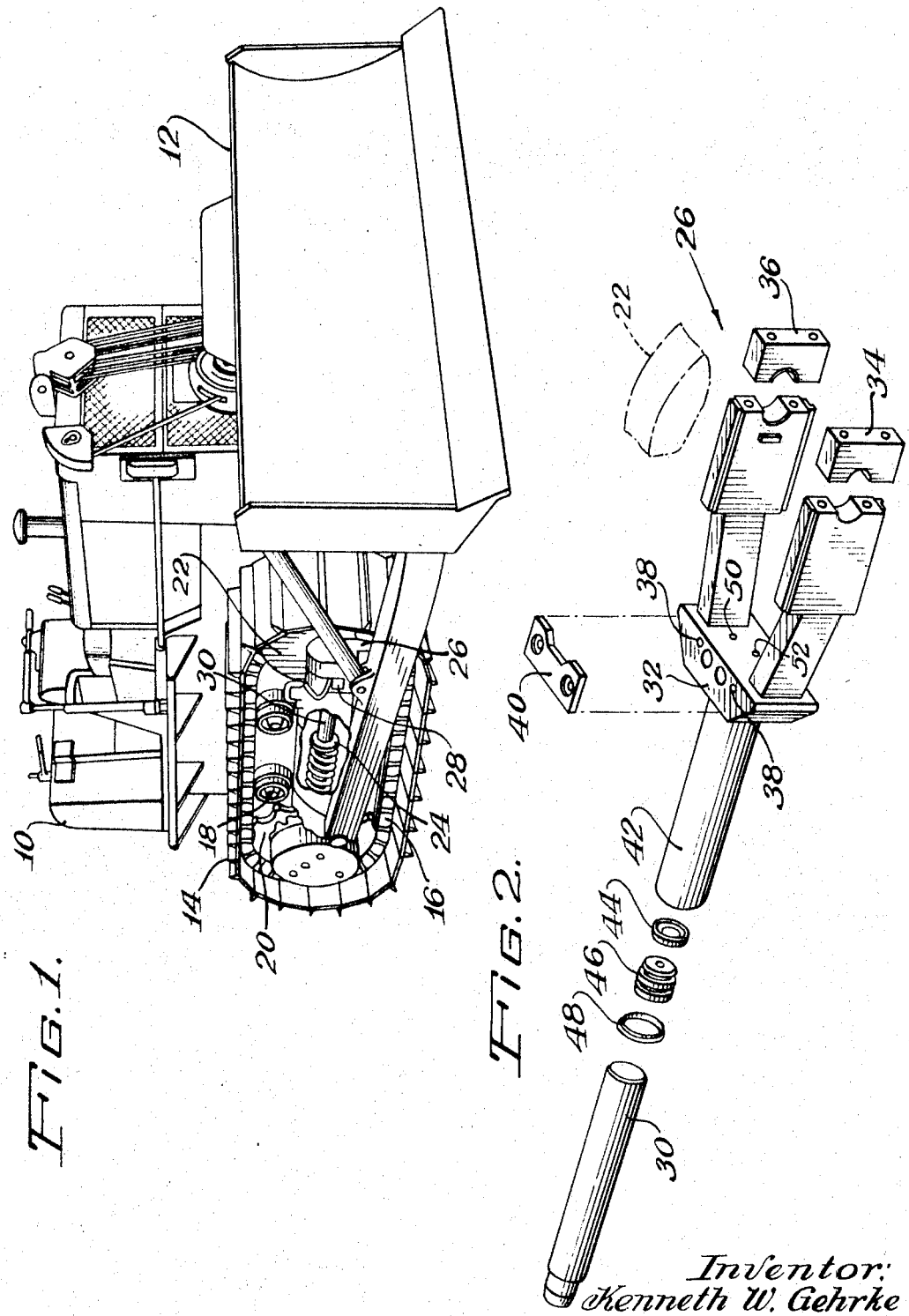

Aug. 26, 1969  K. W. GEHRKE  3,463,559
HYDRAULIC TRACK ADJUSTER FOR TRACTOR
Filed Feb. 20, 1967  3 Sheets-Sheet 3

Inventor:
Kenneth W. Gehrke
By John W. Gaines
Atty.

United States Patent Office 3,463,559
Patented Aug. 26, 1969

3,463,559
HYDRAULIC TRACK ADJUSTER
FOR TRACTOR
Kenneth W. Gehrke, Deerfield, Ill., assignor to International Harvester Company, Chicago, Ill., a corporation of Delaware
Filed Feb. 20, 1967, Ser. No. 617,343
Int. Cl. B62d 55/20
U.S. Cl. 305—10                                         7 Claims

ABSTRACT OF THE DISCLOSURE

Hydraulic track adjuster mechanism for crawler vehicles, effective in preloading the conventional endless track chains thereof to a desired value in the track working range, and effective automatically to hydraulically relieve the load safely back into that working range whenever track tension rises excessively. A single function inlet valve and a dual function valve are provided which communicate with the fluid in the hydraulic system, the dual function valve in an unadjusted position functioning to relieve excessive pressure automatically, and functioning in a position into which it can be adjusted either to release normal track tension or to vent air when refilling the system through the inlet valve.

---

My invention relates to hydraulic valving provided as the control means on a track adjuster for a tractor. Endless longitudinally extending tracks, disposed one on each side of the tractor, are each provided with a track spring that is anchored by a fixed seat at one end, and the hydraulic adjuster intervenes at some point between the anchoring seat and track for applying track preload to the right amount.

Although each track adjuster mechanism can be effectively adjusted in the expanding direction to accommodate track lengthening due to wear, and has effective travel in the opposite direction by contracting the spring so as to foreshorten the mechanism for a distance into a collapsed condition of the track, the necessity for further overtravel arises. Overtravel in the latter direction thus becomes necessary in case of mud packing, the catching of lumber such as a two-by-four or a log between the tractor drive sprocket and the inner face of the track chain, and in similar emergencies not readily foreseen which occur, causing the track spring to bottom out or to go solid as the action is sometimes expressed. It is a problem when no further yieldable collapse can be accommodated, and stresses due to overtensioning overload the mechanism and tend to cause mechanical failure.

My invention materially reduces or substantially eliminates the foregoing problem, the hydraulic valving operating with a safety function to relieve excessive pressure from overloading conditions as will now be explained. Features, objects, and advantages will either be specifically pointed out or become apparent when, for a better understanding of the invention, reference is made to the following description, taken in conjunction with the accompanying drawings which show a preferred embodiment thereof and in which:

FIGURE 1 is perspective front-quarter view, looking specifically at the right front corner of a crawler tractor which embodies the present invention;

FIGURE 2 is an exploded perspective view of some of the track frame fork parts shown in FIGURE 1;

FIGURES 3 and 4 are respective top plan and rear elevational views of the crossplate appearing in FIGURE 2;

FIGURES 5 and 6 are longitudinal sectional views through the crossplate, each being taken along the section lines V—V of FIGURE 4.

Figure 6:
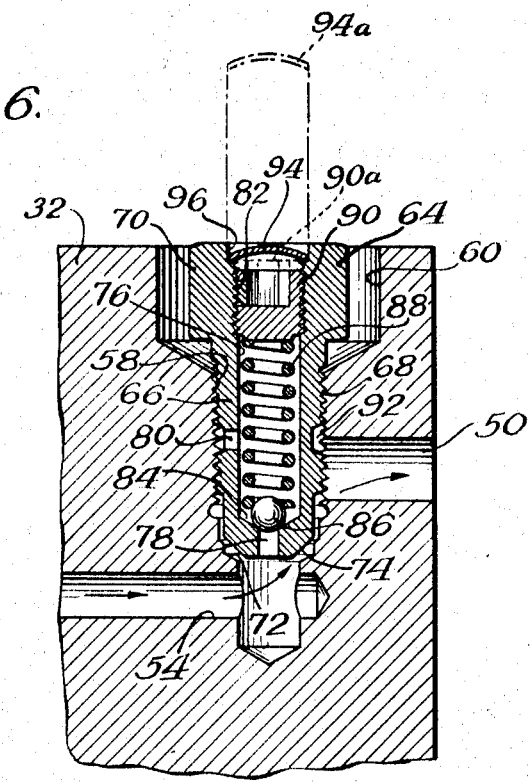
Figure 7:
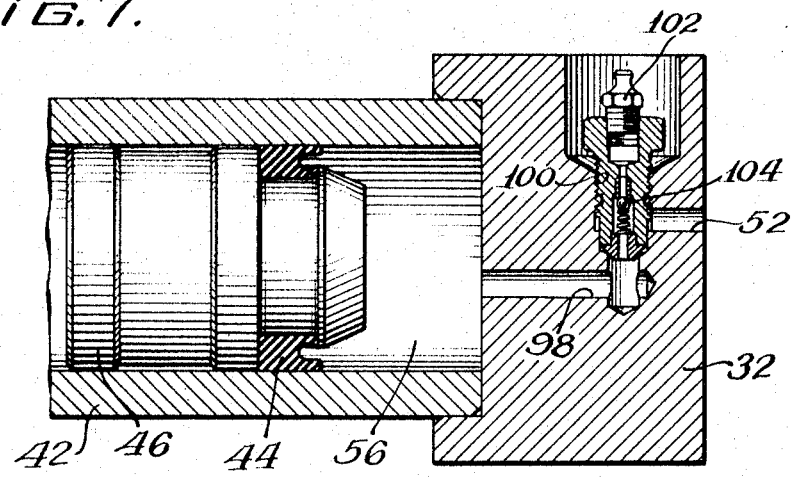
FIGURE 7 is a longitudinal sectional view of the crossplate, taken along the lines VII—VII of FIGURE 4.

More specifically in FIGURE 1 of the drawings, the particular crawler vehicle illustrated is a tractor 10 carrying a tool 12 for dozing at the front thereof. Endless track chain assemblies such as the right track chain 14 are disposed one at each side of the tractor, each being carried by a longitudinally extending track frame 16. The lower and upper flights of the chain 14 are supported by track rollers, including the row of idler rollers 18 which support the upper flight.

At the rear, the track chain 14 passes over a toothed drive sprocket 20 which has a fixed axis and, at the front, the chain passes over a smooth front wheel or idler 22 having shiftable supporting means on the frame 16 whereby the idler axis shifts in the fore and aft direction. A helical coil track spring carried by the frame 16 has two spring seats, one of which at the front is indicated at 24 and the other of which is at the rear and forms a fixed spring anchor.

A fork structure generally indicated at 26 constitutes the idler shiftable supporting means, and is connected at the front to the axle 28 of the front idler 22 and has a piston rod 30 at the rear establishing a connection with the front spring seat 24. Stresses which arise due to forced deflections of the chain 14 are reacted into the track frame and/or sprocket 20 through the idler 22, hydraulic track adjuster and idler fork structure 26, and the track spring, which are series connected.

FORK STRUCTURE—FIGURE 2

In the hydraulic track adjuster and idler fork structure 26, a transversely disposed crossplate 32 forms the base of the fork, and the right bifurcated portion which is rigid with the crossplate carries one fork cap 34 and the other bifurcated portion carries another fork cap 36. The axle, not shown, of the front idler 22 is journalled in the spaced apart front bearings formed by the caps. A plurality of holes in the upper face of the crossplate 32 includes two tapped bores 38 by means of which an idler scraper plate 40 is bolted to the crossplate.

A track adjusting cylinder 42 which extends rearwardly from the small end of the crossplate 32 is affixed thereto so as to hold fluid and receives therein a piston seal 44, a piston 46, a cylinder scraper 48, and the piston rod 30, in that order.

Two discharge openings 50 and 52 are formed in the vertically disposed face of the crossplate 32 at the large, front end.

RELIEF—FIGURES 3, 4, 5, AND 6

In the crossplate 32, a generally longitudinally extending first passage 54 includes a lower passage means communicating at the rear, in the upper left quadrant (FIGURE 4), with a piston chamber 56, and a parallel upper passage means which communicates to atmosphere through the crossplate discharge opening 50. A threaded, vertically disposed bore 58 in the crossplate intersects the first passage 54 intermediate the ends of the latter and is enlarged at the upper end to form a tool access pocket 60 in the crossplate. The crossplate is of general trapezoidal shape in plan view, and the referred to small end thereof carries the front end of the cylinder 42 in rigid, sealed relation, and forms the floor 62 of the chamber 56 mutually defined by the cylinder 42, the crossplate, and the piston 46 which confronts the crossplate.

The crossplate 32 carries a combined vent, release, and safety valve means 64, including a body sleeve 66 formed with threads 68 which mate with the bore threads, and an integral head 70 of hexagonal shape having a recessed position within the crosspiece tool pocket 60. Rotating the valve means 64 with a wrench introduced into the pocket and applied to the head 70 causes the sleeve 66 to move from and toward a constricted conically flaring portion 72 in the bore 58 (FIGURE 6), so that a first bevel or conical valve element 74 formed on the inner end of the sleeve unseats and seats with respect thereto.

The body sleeve 64 has a hollow interior 76 which is intersected, at the inner end, by an axial inlet passage 78, is further intersected, at the side, by a side port 80, and is also intersected at the head of the valve by a threaded bore 82. The axial inlet passage 78 enlarges into the interior by means of a conically flaring transition portion 84. A steel ball forms a second valve element 86 which moves from and toward the flaring transition portion 84 in directions to automatically unseat and seat thereon. A helical coil spring 88 presses at one end against the second valve element 86 biasing the latter in the direction of the piston chamber 56 so as to hold it seated against ordinary pressures. At the opposite end, the spring 88 thrusts against an adjustable, plug-like seat 90 carried in the threads 82 of the bore.

An uninterrupted groove 92 having outwardly divergent, diagonal side walls is formed on the sleeve 64 to provide a relieved area about midway of the sleeve threads, in line with the port 80. The groove 92 registers transversely with the upper passage means of the passage 54 so as to complete an internal path of fluid escape leading from the axial passage 78, past the valve 86, through the interior 76 of the sleeve, the port 80, and thence through the groove 92 into the passage means and out of the opening 50.

The valve means is preassembled before installation in the crossplate. The spring seat 90 is advanced in the threads 82 and left in a preloaded position such as indicated by the dotted lines 90a, or is further advanced into some more preloaded position such as indicated by the solid lines 90, as desired. Thereafter, a Welch plug indicated by the dotted lines 94a is inserted in a counterbore 96 in the seat 90 and permanently deformed into the final position shown by solid lines 94.

The valve element 86 is shown in its unseated, relief position in solid lines in FIGURE 5.

FILL—FIGURES 3, 4 AND 7

For purposes of filling or charging the piston chamber 56, a second longitudinally extending passage 98 formed of lower and upper passage means communicates at one end with the chamber 56 in the lower right quadrant as viewed in FIGURE 4. The upper passage means communicates to atmosphere at the front through the opening 52. A vertically disposed threaded bore 100, generally similar to the previous bore 58, intersects the second passage 98 intermediate its ends and carries therein a recessed, two-piece grease inlet fitting 102. A spring biased, ball check valve 104 within the fitting 102 prevents escape of fluid admitted into the piston chamber 56, and a nipple piece forming the outer end of the fitting receives a lubricant gun.

To tension each track chain, the lubricant gun is applied to the nipples of the fittings 102, which are conventional. The lubricant, which is conventional and which functions effectively in the fore and aft direction when forced in as hydraulic pressure fluid, is multi-purpose grease or chassis lubricant, optionally. The piston 46 in the system is thus hydraulically extended within the cylinder 42 which communicates the reaction to the track 14 so as to stress it to some point within its normal working range of tension. In the preliminary phase, the valve means 64 has the position shown in FIGURE 6 venting the hydraulic system of air and, in the final phase of tensioning, the valve means has the blocking position shown in FIGURE 5 (but with the second valve element 86 seated).

Mud packing, or a snagged log in the chain 14 creates the excessive pressure condition specifically illustrated in FIGURE 5, the second valve element 86 operating at that time as a safety relief valve to afford automatic collapse of the tensioning mechanism through all or an appropriate portion of the range indicated at 106 to prevent damage to the tractor.

RELEASE—FIGURE 6

For servicing the chain, the valve means 64 is unscrewed for a half turn or so into the position shown in solid lines in FIGURE 6, whereupon the lubricant escapes in a path around the sleeve 66 and out the atmosphere connected opening 50. If the valve means 64 freezes in its threads or the opening 50 plugs up, then in those unlikely emergencies the entire fitting 102 can be unscrewed for a half turn or more to allow escape of the lubricant out opening 52. Either way, chain tension is thus completely released.

In one physically constructed embodiment of the invention, the spring seat 90 was tightened against the spring 88 sufficiently to pre-set the second valve element 86 to relieve at 10,000 p.s.i. The allowable stress depends upon the strength of the components supporting the track, and lower valve relief settings are employed in installations where less strength is available in the tractor, particularly in the sprocket housing.

WORKING RANGE

In maintaining the present mechanism in the working range desired, the emphasis herein is placed upon automatically controlling maximum track tension. Therein lies a trouble spot that has heretofore been generally overlooked and that has nevertheless continued to exist as a potential source of permanent mechanical damage. On the other hand minimum track tension which has received some attention in the past is not usually a source of lasting damage. Moderately excessive slackness is merely noisy and has been found bothersome primarily in that lone respect. Anyway, slackness does not abruptly occur, but seems to accumulate slowly and noticeably, due mostly to gradual chain wear or gradual hydraulic leakage.

Normally, the track spring force in the forward direction is reacted in part against the track because of track preload transmitted to the latter through the rod 30 and the balance of the adjuster, and reacted in part against a front stop, not shown, limiting forward travel of the front spring seat 24. Thus, the spring can, in its installed precompressed condition, be sustained under a precompressed force of, for example, 4,800 lb., whereas the preload on the track is no more than a fraction of that force. Such preload is maintained due to vigilance of the operator who, upon noting too much slack in the track chain, removes the undesired excess by pumping up the piston chamber 56 until it has extended sufficiently.

Variations within the spirit and scope of the invention described are equally comprehended by foregoing description.

What is claimed is:

1. Hydraulic track adjuster and idler fork structure for use with endless track frame means including a piston, and a cylinder connected to said hydraulic structure and containing both the hydraulic fluid and the piston therein, said hydraulic structure characterized by:

a passaged portion of said structure which, with the cylinder and piston, cooperatively holds said fluid, said portion being formed with separate passages therein communicating at one end with the fluid inside the cylinder and communicating at the other end to atmosphere, each passage further having a bore formed in the passaged portion so as to intersect the passage intermediate the ends thereof;

multiple valving for controlling said passages including plural hollow sleeve means disposed one in each passage in the aforesaid bore thereof;

said hollow sleeve means disposed in one of the passages comprising a fitting shiftable within the passage bore and including first and second valves, said fitting having the first valve affixed thereto and unseating therewith from a portion of the bore in a direction away from the cylinder to open a release path within the bore leading around the fitting and into said one passage for fluid escape;

said second valve comprising a check ball in the fitting and unseating, from a portion of the same, in the direction of the cylinder to open a fluid inlet path leading from an atmosphere connected end of the fitting to charge the cylinder with fluid introduced through said one passage;

The hollow sleeve means disposed in another passage comprising a sleeve shiftable within the passage bore and including first and second valve elements, said sleeve having the first valve element affixed thereto and unseating therewith from a portion of the bore in a direction away from the cylinder to open an air vent/release path within the bore leading around the sleeve and into said other passage for fluid escape; said second valve element comprising a predeterminedly pre-loaded, relief ball in said sleeve and unseating, from a portion of the same, in a direction away from the cylinder to open a maximum pressure regulating relief path within the bore leading through the interior of the sleeve and into said other passage for fluid escape.

2. The invention of claim 1, the passaged portion comprising:

a crossplate receiving the cylinder and forming at a generally rear crossplate portion in the fore and aft direction a transverse end of the piston chamber confronting the piston in the cylinder;

said passages at their other end aforesaid intersecting the crossplate at the point in the front face portion thereof to communicate to atmosphere in the described manner.

3. The invention of claim 2, characterized by:

said crossplate presenting thereon an accessible surface intermediate the rear and front face portions; said hollow sleeve means being at their outer end at least adjacent the plane of said accessible crossplate surface and provided with a tool receiving head on the fitting and a tool receiving head on the sleeve.

4. The invention of claim 3, characterized by:

a common plate covering the outer end of the sleeve means;

said plate comprising an idler scraper secured to said surface of said crossplate.

5. The structure of claim 2, in combination with a track spring structure, which structures cooperatively form a series connected mechanism.

6. The invention of claim 5, the track spring structure characterized by:

a first helical coil spring pre-loaded only to a partially collapsed condition so as to retain and be capable of limited foreshortening travel to take-up overload;

said second valve element effective under conditions of excessive overload due to the spring going solid because of the coils bottoming against one another, to afford automatic escape of fluid from the cylinder in the described manner and thereby afford partial foreshortening of the piston and cylinder.

7. Hydraulic track adjuster and idler fork structure for use with endless track frame means including a cylinder for the hydraulic fluid, said hydraulic structure characterized by:

a passaged portion of said structure for cooperating with the cylinder to hold said fluid, said portion being formed with passage means therein communicating at one end with the fluid inside the cylinder and communicating at the other end to atmosphere;

multiple valving for controlling said passage means including plural hollow sleeves in the passage means shiftable in different ones of bores formed in the passaged portion so as to separately intersect the passage means intermediate the ends thereof;

a first one of the sleeves in one bore including first and second valves, said first sleeve having the first valve affixed thereto and unseating therewith from a portion of the bore in a direction away from the cylinder to open a release path within the bore leading around the fitting into the passage means for fluid escape;

said second valve comprising a check valve in the sleeve and unseating, from a portion of the same, in the direction of the cylinder to open a fluid inlet path leading from an atmosphere connected end of the first sleeve to charge the cylinder with fluid introduced through the passage means;

a second sleeve in another bore including first and second valve elements, said second sleeve having the first valve element affixed thereto and unseating therewith from a portion of the bore in a direction away from the cylinder to open an air vent/release path within said other bore leading around the second sleeve and into the passage means for fluid escape;

said second valve element comprising a predeterminedly pre-loaded relief valve in said second sleeve and unseating, from a portion of the same, in a direction away from the cylinder to automatically open a maximum pressure regulating relief path within said other bore leading through the interior of the second sleeve and into said passage means for fluid escape.

References Cited

UNITED STATES PATENTS

| | | | |
|---|---|---|---|
| 2,818,311 | 12/1957 | Ashley | 305—10 |
| 2,959,451 | 11/1960 | Weber | 305—10 |
| 2,975,803 | 3/1961 | Vallee | 137—599.2 |
| 3,082,043 | 3/1963 | Orton | 305—10 |
| 2,474,464 | 6/1949 | Cable | 91—452 X |

FOREIGN PATENTS

| | | |
|---|---|---|
| 1,086,008 | 10/1967 | Great Britain. |
| 1,416,970 | 9/1965 | France. |

OTHER REFERENCES

German printed application 1,095,681, Cordes, December 1960.

RICHARD J. JOHNSON, Primary Examiner

U.S. Cl. X.R.

74—242.12; 91—452; 137—599.2